(No Model.)
J. NICOLSON.
TELEGRAPHIC SIGNAL.
No. 597,587. Patented Jan. 18, 1898.
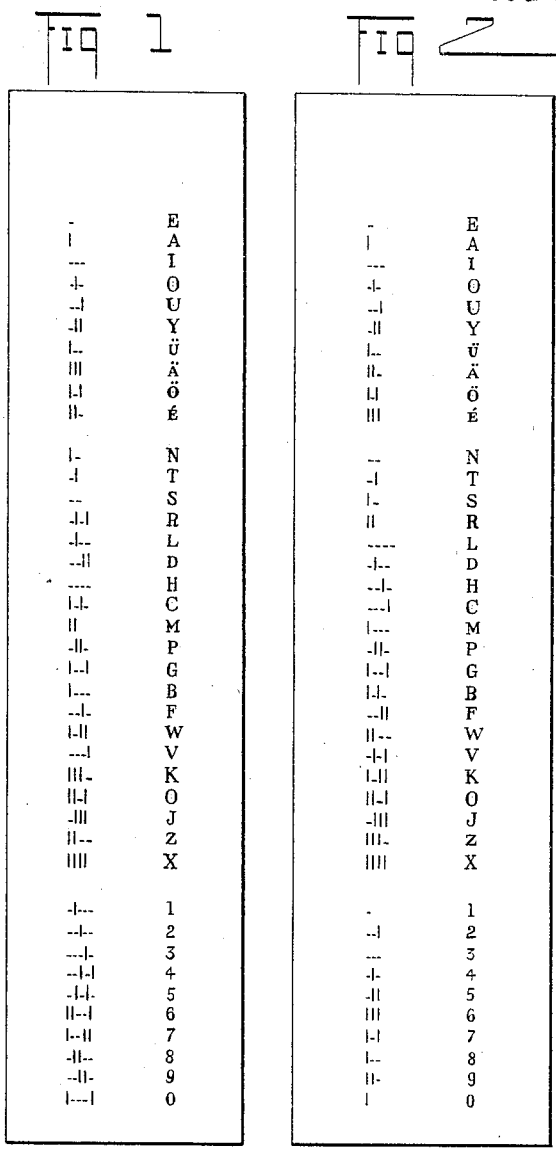

UNITED STATES PATENT OFFICE.

JAMES NICOLSON, OF BUENOS AYRES, ARGENTINA.

TELEGRAPHIC SIGNAL.

SPECIFICATION forming part of Letters Patent No. 597,587, dated January 18, 1898.

Application filed February 26, 1897. Serial No. 625,188. (No model.)

*To all whom it may concern:*

Be it known that I, JAMES NICOLSON, a subject of the Queen of Great Britain, residing in Buenos Ayres, Argentina, have invented new and useful Improvements in Telegraphic Signals, of which the following is a full, clear, and exact description.

The invention relates to telegraphy; and its object is to provide new and improved telegraphic signals arranged to simplify the transmission of telegraphic messages, especially in long-distance submarine telegraphy and heliography, which render mistakes next to impossible and which in connection with special code-words form a simple international telegraphic vocabulary.

The invention consists principally of signals having an uneven number of elementary motions (dots and dashes) for the vowels and accented vowels and signals having an even number of elementary motions (dots and dashes) for the consonants of the alphabet.

Reference is to be had to the accompanying drawings, forming a part of this specification, in which—

Figure 1 shows a table containing the signals and the alphabetic and numerical value thereof, and Fig. 2 shows a table containing a modified form of the improvement.

As shown in Fig. 1, the vowels "e," "a," "i," "o," "u," "y," and the accented vowels "ü," "ä," "ö," and "é" are each represented by an uneven number of elementary telegraphic motions. For instance, the vowel "u" is represented by two dots and a dash, and the accented vowel "ö" is represented by a dash, a dot, and a dash. As shown, only one or three elementary motions are used for any one of the vowels. The consonants of the alphabet are represented by an even number of elementary motions, and, as shown, only two and four such motions are used—that is, the consonant "r" consists of a dot, a dash, a dot, and a dash—that is, four motions—while the consonant "n" is composed of but two motions—namely, a dash and a dot.

In the table represented by Fig. 2 the individual arrangement of the motions for the several letters of the alphabet is slightly different from the one shown in Fig. 1, but an uneven number of elementary motions represents the vowels and an even number the consonants, as above described.

The numerals as shown in Fig. 1 consist of five elementary motions, and as indicated in Fig. 2 one or three elementary motions are used—that is, in both cases an uneven number of motions is employed to represent the numerals. In the latter case preconcerted signals—say those representing the letters "n n"—may be added when necessary. The international Morse code representing numerals may be assigned to Roman numerals.

In order to render the system above described especially serviceable for cipher-codes, the latter have code-words composed of alternately-arranged vowels and consonants, so that in transmitting a code-word even and uneven elementary motions must necessarily alternate, and hence a mistake in the transmission of the word is not liable to take place.

In carrying out the principle of allocating odd numbers of signaling motions to vowels and even numbers of motions to consonants it is evident that four accented vowels necessarily receive comparatively shorter signals than appear to be warranted, especially in English communication; but this apparent disproportion will be completely counterbalanced by the benefits which in general will accrue in connection with ordinary and preconcerted language and especially in connection with the above-mentioned code-words. In other words, accented vowels obtain shorter signals than some consonants which occur more frequently in ordinary language; but when my code-words are employed the frequency of such accented vowels will be greater than these consonants, and thus justify the shorter signals assigned them in my system.

It is evident that instead of having uneven elementary motions for the vowels and even motions for the consonants the order may be reversed—that is, even elementary motions may be employed for all the vowels and uneven motions for the consonants.

In connection with the present systems of telegraphic alphabets I am enabled, by the selection of a few choice vowels and consonants corresponding to signals of alternate odd and even motions or signals differing alternately from each other by two or three elementary motions, to produce a telegraphic vocabulary which is somewhat restricted, but yet sufficiently ample for all commercial and other purposes, and which will at once be orthographically and telegraphically simple and which will be equitable between the public and telegraphic administrations—that is to say, special code-words—such, for instance, as the three vowels "e," "o," "u," represented by odd (one and three) motions, and the ten consonants "b," "c," "h," "j," "l," "p," "q," "v," "x," "z," represented by even (two and four) motions—can be carried out with the present system of conventional signals.

Having thus described my invention, I claim as new and desire to secure by Letters Patent—

1. Telegraph-signals, having an uneven number of elementary motions for the vowels and accented vowels of the alphabet, and an even number of such motions for the consonants of the alphabet, substantially as shown and described.

2. Telegraph-signals having one and three elementary motions (dots and dashes) for the vowels and accented vowels, and two and four elementary motions (dots and dashes) for the consonants of the alphabet, substantially as shown and described.

3. The combination with code-words composed of alternate vowels and consonants, of telegraphic signals having an uneven number of elementary motions for the vowels and accented vowels, and an even number of elementary motions for the consonants of the alphabet, substantially as shown and described.

JAMES NICOLSON.

Witnesses:
G. F. REDFERN,
C. G. REDFERN.